(12) United States Patent
Nagaoka et al.

(10) Patent No.: US 8,974,209 B2
(45) Date of Patent: Mar. 10, 2015

(54) UNDERWATER CUTTING AND PELLETIZING APPARATUS

(75) Inventors: Tatsuto Nagaoka, Takasago (JP); Masahiko Kashiwa, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 350 days.

(21) Appl. No.: 13/169,292

(22) Filed: Jun. 27, 2011

(65) Prior Publication Data

US 2012/0012686 A1    Jan. 19, 2012

(30) Foreign Application Priority Data

Jul. 13, 2010    (JP) .................................. 2010-158739

(51) Int. Cl.
*B29B 9/06*    (2006.01)

(52) U.S. Cl.
CPC ...................................... *B29B 9/065* (2013.01)
USPC .................. 425/68; 425/67; 425/70; 425/71; 425/296; 425/307; 425/313; 425/377; 425/378.1; 425/404; 264/142; 264/211.13

(58) Field of Classification Search
CPC ............ B29B 9/06; B29B 9/065; B29B 9/02; B29B 13/04; B29B 13/045; B29C 47/78; B29C 47/92; B29C 47/788
USPC ........... 425/67, 68, 69, 70, 71, 296, 306, 307, 425/311, 313, 83, 377, 378.1, 404; 264/83, 264/142, 211.13
See application file for complete search history.

(56) References Cited

U.S. PATENT DOCUMENTS

| 5,895,617 | A |   | 4/1999 | Mizuguchi et al. |
| 5,942,170 | A | * | 8/1999 | Peitz ............................ 264/40.6 |

(Continued)

FOREIGN PATENT DOCUMENTS

| CN | 101448615 A | 6/2009 |
| DE | 10 2006 022 555 A1 | 11/2007 |

(Continued)

OTHER PUBLICATIONS

German Office Action issued Oct. 1, 2012 in Patent Application No. 10 2011 079 028.4 with English Translation.

(Continued)

*Primary Examiner* — Seyed Masoud Malekzadeh
(74) *Attorney, Agent, or Firm* — Oblon, McClelland, Maier & Neustadt, L.L.P.

(57) ABSTRACT

An underwater cutting and pelletizing apparatus includes: a cutting device that cuts, with a cutter in a water chamber, molten resin, extruded from a die, into pellets; a separation device that separates, from carrier water, pellets sent from the water chamber of the cutting device to downstream with carrier water; a tank that is disposed below the separation device and stores carrier water discharged from the separation device; and a circulation path formed so as to circulate carrier water between the tank and the water chamber, wherein a hydroelectric power generator is provided on a return side of the circulation path formed on a downstream side of the water chamber, and generates electricity from the energy of the carrier water flowing downward in this path. According to such a configuration, the underwater cutting and pelletizing apparatus is made so as to achieve energy savings by recovering and reusing potential energy accompanying carrier water pumped up to a higher location.

1 Claim, 3 Drawing Sheets

(56) References Cited

U.S. PATENT DOCUMENTS

| | | | |
|---|---|---|---|
| 6,551,643 B2 * | 4/2003 | Bernatz et al. | 426/516 |
| 7,629,530 B2 * | 12/2009 | Inaoka | 136/205 |
| 7,815,828 B2 * | 10/2010 | Kobayashi et al. | 264/142 |
| 2005/0194034 A1 * | 9/2005 | Yamaguchi et al. | 136/205 |
| 2005/0263176 A1 * | 12/2005 | Yamaguchi et al. | 136/203 |
| 2006/0027257 A1 * | 2/2006 | Yamaguchi et al. | 136/203 |
| 2006/0130888 A1 * | 6/2006 | Yamaguchi et al. | 136/205 |
| 2007/0132247 A1 * | 6/2007 | Galayda et al. | 290/44 |
| 2008/0128012 A1 * | 6/2008 | Schick et al. | 136/201 |

FOREIGN PATENT DOCUMENTS

| | | | | |
|---|---|---|---|---|
| DE | 60 2004 006 248 T2 | 12/2007 | | |
| DE | 10 2008 062 480 A1 | 6/2010 | | |
| JP | 04-263906 | 9/1992 | | |
| JP | 2006-110777 | 4/2006 | | |
| JP | 2006308234 A * | 11/2006 | | F24H 1/00 |
| JP | 2006110777 A * | 4/2008 | | B29B 9/06 |
| JP | 2010-036338 | 2/2010 | | |

OTHER PUBLICATIONS

Combined Chinese Office Action and Search Report issued May 31, 2013 in Patent Application No. 201110204749.4 (with English language translation).

Japanese Office Action mailed Dec. 17, 2013 in Japanese Application No. 2010-158739 filed Jul. 13, 2010.

* cited by examiner

UNDERWATER CUTTING AND PELLETIZING APPARATUS

BACKGROUND OF THE INVENTION

1. Field of the Invention

The present invention relates to an underwater cutting and pelletizing apparatus that produces resin pellets.

2. Description of the Related Art

An underwater cutting and pelletizing apparatus has a cutting device, a separation device installed at a position higher than the cutting device, and a tank installed below this separation device. Between this cutting device, separation device and tank are connected for water supply, thereby forming a circulation path of water in the overall underwater cutting and pelletizing apparatus (for example, refer to Japanese Patent Application Publication No. 2006-110777).

The cutting device makes pellets by finely cutting molten resin, which is pressurized and supplied by a resin kneader, in a water chamber. These pellets are discharged from the water chamber along with water, and fed to the separation device. The separation device is for separating water from the pellets sent out from the water chamber of the cutting device with water. In addition, the tank stores the water discharged from the separation device for a short term. The water leaving the tank is cooled to a predetermined temperature, and then supplied to the water chamber of the cutting device again.

It should be noted that the water sent from the cutting device to the separation device is called carrier water due to having a function of carrying the pellets; however, hereinafter the water circulating in the entirety of the underwater cutting and pelletizing apparatus (i.e. including water returned from the separation device to the tank and cutting device) is all called carrier water.

The reason that the installation position of the separation device is higher than the cutting device as described above is to prevent (impart backpressure) cavitations from occurring in the water chamber of the cutting device, to cool the water as much as possible by lengthening the carried distance of the carrier water to a certain extent, and the like.

As a result, the separation device is installed at a location that is higher than the cutting device such as on a higher floor of the building in which the cutting device is installed, a result of which the height difference between the separation device and the tank is also large. For example, with a large-scale underwater cutting and pelletizing apparatus such as that in which the volume of water ejected from the water chamber of the cutting device toward the separation device exceeds 600 m$^3$/h, the height difference from the separation device to the tank may reach 20 to 30 m.

Conventionally, no energy is recovered from the carrier water sent from the separation device to the tank, and thus the potential energy has been wasted.

On the other hand, the inside of the water chamber of the cutting device is controlled to be constant at approximately 50° C. to 80° C. so as to be suitable for the cutting of molten resin. Therefore, the water temperature of the carrier water ejected from the water chamber of the cutting device (towards the separation device) is 90° C. or more.

As a result, a cooling device (heat exchanger) is installed in the midstream of the path supplying this carrier water to the water chamber of the cutting device again through the tank, whereby the temperature of the carrier water is cooled to approximately 50° C.

The amount of heat that is radiated by this heat exchanger, i.e. the amount of heat absorbed by the carrier water from the molten resin in the water chamber of the cutting device, is not used in any way, and the thermal energy has thus been wasted.

SUMMARY OF THE INVENTION

The present invention has been made taking the above-mentioned situation into account, and has an object of providing an underwater cutting and pelletizing apparatus configured so as to achieve energy savings by recovering and reusing potential energy generated due to the carrier water being pumped to a high location, thermal energy absorbed by the carrier water from the molten resin, and the like.

In order to achieve the above-mentioned object, the present invention takes the following measures.

Specifically, an underwater cutting and pelletizing apparatus according to the present invention includes: a cutting device that cuts, with a cutter in a water chamber, molten resin, extruded from a die, into pellets; a separation device that separates, from carrier water, the pellets sent from the water chamber of the cutting device to downstream with carrier water, the separation device being disposed at a location higher than the cutting device; a tank that is disposed below the separation device and stores carrier water discharged from the separation device; a circulation path formed so as to circulate carrier water between the tank and the water chamber; and an electric power generator. Herein, the electric power generator is at least one of a hydroelectric power generator that generates electric power from the energy of carrier water flowing downward, and a thermoelectric power generator that performs electric power generation based on a quantity of heat possessed by carrier water that is in the circulation path.

The hydroelectric power generator can be provided to the path in which carrier water flows down from the separation device of a higher installation to the tank installed below the separation device, for example.

If the hydroelectric power generator is provided, electric power generation is performed in this hydroelectric power generator using the energy of the carrier water flowing downwards. Therefore, the electricity generated can be used in various applications, thereby achieving effective utilization of energy.

On the other hand, it is preferable that the thermoelectric power generator is provided on a downstream side of the water chamber and on an upstream side of the tank in the circulation path. However, the installation location is not particularly limited in detail so long as being in this path. In particular, the thermoelectric power generator is more preferably provided at a location close to the outlet of the water chamber.

If the thermoelectric power generator is provided, electric power generation is performed in this thermoelectric power generator using the quantity of heat possessed by the carrier water. Therefore, the electricity generated can be used in various applications, thereby achieving effective utilization of energy.

If both the hydroelectric power generator and the thermoelectric power generator are provided, electric power generation becomes possible from both the energy of the carrier water flowing downwards and the quantity of heat possessed by the carrier water, whereby achieving more effective utilization of energy.

The thermoelectric power generator may be a thermoelectric element that is mounted to a pipe configuring the return side of the circulation path or the tank.

The underwater cutting and pelletizing apparatus according to the present invention can recover and reuse potential energy arising from carrier water pumped up to a higher location, thermal energy absorbed by carrier water from molten resin, and the like, a result of which it is possible to achieve an energy savings.

DESCRIPTION OF THE PREFERRED EMBODIMENTS

Embodiment of the present invention will be explained hereinafter with reference to the drawings.

First Embodiment

Figure 1:
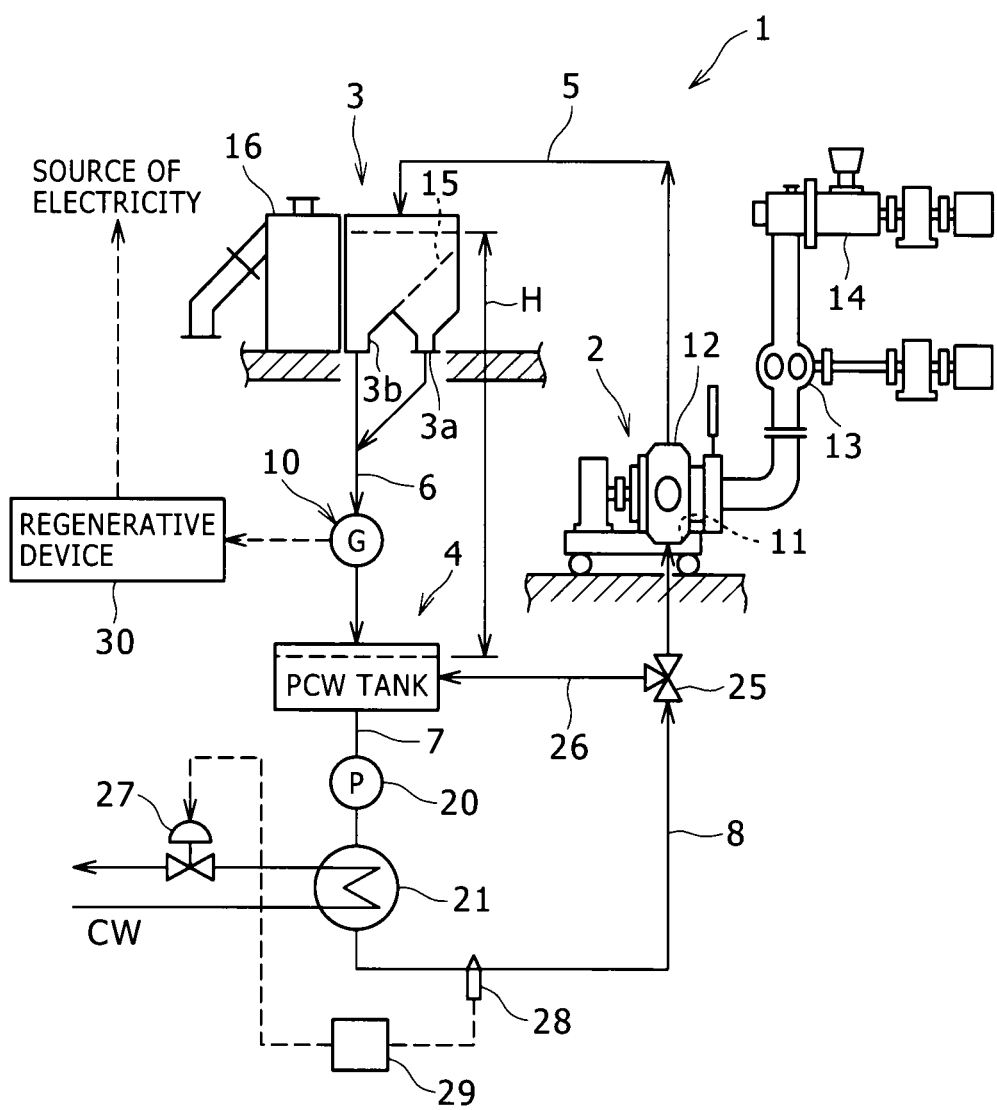
FIG. 1 is a side view schematically showing a first embodiment of an underwater cutting and pelletizing apparatus according to the present invention.

FIG. 1 shows a first embodiment of an underwater cutting and pelletizing apparatus 1 according to the present invention.

This underwater cutting and pelletizing apparatus 1 has a cutting device 2, a separation device 3, and a tank 4. The separation device 3 is installed at a position higher than the cutting device 2. In addition, the tank 4 is installed below this separation device 3. A pump 20 is installed at an output side of the tank 4.

Between an output side of the cutting device 2 and an input side of the separation device 3 is connected by a first pipe 5, between the output side of the separation device 3 and the input side of the tank 4 is connected by a second pipe 6, between the output side of the tank 4 and the input side of the pump 20 is connected by a third pipe 7, and between the output side of the pump 20 and the input side of the cutting device 2 is connected by a fourth pipe 8.

All of the devices (cutting device 2, separation device 3 and tank 4) of this underwater cutting and pelletizing apparatus 1 are configured in this way as a circulation path that can cause carrier water to circulate.

Furthermore, a hydroelectric power generator 10 that generates electric power from the downward flow of carrier water is provided between the output side of the cutting device 2 and the input side of the pump 20, i.e. vertically within a return side of the circulation path, or for that matter, vertically between the output side of the separation device 3 and the input side of the tank 4 (within the path of the second pipe 6).

The configuration of each device will be explained in detail next.

The cutting device 2 has a housing 12, and is made so that a water chamber 11 is formed inside of this housing 12. One side of this housing 12 is configured by a die (not illustrated) provided so as to face the inside of the water chamber 11, and a rotatable cutter (not illustrated) capable of advancing and retracting relative to the die inside the water chamber 11 is provided at the other side of the housing 12. The die is substantially disc shaped, with a plurality of nozzles penetrating therethrough provided at substantially equal intervals. A resin supply device 13 such as a gear pump or an extruder is connected at a primary side of this die. In addition, in a case of this resin supply device 13 being a gear pump, a resin kneader 14 is further coupled at the primary side.

Therefore, when molten resin melted and kneaded by the resin kneader 14 is supplied to a side of the cutting device 2 through the resin supply device 13, the molten resin is continuously ejected from each nozzle of the die while maintaining a constant cross-sectional shape inside the water chamber 11 of the cutting device 2, whereby this molten resin is finely cut into pellets by the rotating cutter. These pellets are fed to the separation device 3 from the water chamber 11 along with water via the first pipe 5.

These cutting device 2, resin supply device 13, resin kneader 14, etc. are installed at the same height as each other on a first (ground) floor of a building, for example.

The separation device 3 is a water basin having a screening portion 15 in which a plurality of slits, screening holes, or the like are formed in a size that allows carrier water to pass, but not the pellets to pass therethrough, and outlet portions 3a, 3b that discharge only carrier water are provided on a secondary side and basin bottom portion of the screening portion 15.

Therefore, the pellets sent out from the water chamber 11 of the separation device 2 along with carrier water become separated from the carrier water in this separation device 3. The pellets thus separated at the screening portion 15 are sent to a pellet dryer 16 installed in the vicinity of this separation device 3, and are dried. On the other hand, the carrier water after the pellets have been separated and removed therefrom is discharged from the output side of the separation device 3 (outlet portions 3a, 3b) to the tank 4 via the second pipe 6.

This separation device 3 is installed to be higher than the cutting device 2 as has been described. For example, in a case of the cutting device 2 being installed on the first (ground) floor of a building, this separation device 3 would be installed on the second floor of the same building or on an upper floor thereof. By this separation device 3 being installed to be higher than the cutting device 2, a back pressure is imparted inside the water chamber 11 of the cutting device 2 via the carrier water in the first pipe 5 connecting between the output side of the cutting device 2 and the input side of the separation device 3. As a result, cavitations inside this water chamber 11 are prevented from occurring. In addition, utilizing a carried distance by the first pipe 5, the carrier water is radiated (cooled).

The tank 4 is for short-term storage of carrier water discharged from the separation device 3. This tank 4 is installed so as to be below the separation device 3 as has been described, e.g., 20 to 30 m below the separation device 3.

It should be noted that the pump 20 and a heat exchanger 21 are provided in the path of the third pipe 7 (portion of the return side of circulation path) and the fourth pipe 8 (feed side of the circulation path) connecting between the output side of this tank 4 and the input side of the cutting device 2. Naturally, the pump 20 imparts a supply water pressure to the carrier water, and the heat exchanger 21 is a cooling device that cools the carrier water. A water cooling system or the like is used for the heat exchanger 21, which cools carrier water on the order of 90° C. to roughly on the order of 50° C.

In addition, a three-way valve 25 is provided in the fourth pipe 8 connecting between the output side of the pump 20 and the input side of the cutting device 2. Independently from the fourth pipe 8, between this three-way valve 25 and the tank 4 is also connected by a fifth pipe 26.

In a case of setting this three-way valve 25 in a state in communication with the fourth pipe 8 to arrange for carrier water to be supplied from the output side of the tank 4 to the water chamber 11 of the cutting device 2 via the pump 20, the carrier water (approximately 50° C.) having been cooled by the heat exchanger 21 is supplied to the water chamber 11, and cutting is initiated by the cutting device 2. In contrast, in a case of setting so that the carrier water from the fifth pipe 26 returns to the tank 4 and the carrier water is not supplied to the water chamber 11 of the cutting device 2 by switching the three-way valve 25, cutting by the cutting device 2 stops. The supply of carrier water into the water chamber 11 and the stopping thereof is performed by carrying out such switching of the three-way valve 25 as necessary.

The hydroelectric power generator 10 includes a water turbine (not illustrated) that rotates by receiving the flow of carrier water discharged from the separation device 3 and flowing down toward the tank 4, and causes a power generator (not illustrated) to be rotationally driven by the rotation of this water turbine, and generates electricity by way of this power generator.

A speed regulator (not illustrated) for stabilizing the rotation of the water turbine and for variable control depending on the situation is preferably provided at a rotation supporting portion of the water turbine. In addition, the phase, frequency, voltage, etc. of the electricity generated by the power generator may be set to predetermined values, and a regenerative device 30 for returning the electricity to outside may be connected to the power generator.

It should be noted that mode of use of the electricity (direct current or alternating current) produced by the regenerative device 30 is not to be considered limited in any way. For example, it may be used as electric power for various controls in the underwater cutting and pelletizing apparatus 1, or may be used as driving electric power to peripheral equipment, lighting inside the building or electric power for air conditioning. Naturally, it may be configured so as to return electricity to the electric supply facility (so-called power selling to the power utility).

Next, operation of the underwater cutting and pelletizing apparatus 1 will be explained.

The carrier water stored in the tank 4 is supplied to the water chamber 11 of the cutting device 2 via the fourth pipe 8, which is the feed side of the circulation path, by the pump 20. In addition, molten resin is supplied to the cutting device 2 through the resin kneader 14 and the resin supply device 13, and pellets are produced in the water chamber 11 of the cutting device 2.

The temperature in the water chamber 11 is maintained at a temperature optimum for cutting molten resin (50° C. to 80° C.), by means of the temperature of the carrier water cooled by passing through the heat exchanger 21, the temperature gained from the molten resin in the water chamber 11 of the cutting device 2, and further the temperature managed using a temperature sensor 28 and temperature controller 29 installed in the third pipe 7 by way of a temperature control valve 27 provided in a pipe CW on a primary cooling water side of the heat exchanger 21.

Therefore, the temperature of the carrier water ejected from the cutting device 2 is also made stable at approximately 90° C.

The pellets produced in the water chamber 11 are sent out from the water chamber 11 along with carrier water. The carrier water containing pellets is guided in the first pipe 5 to be pumped up to the height at which the separation device 3 is installed, and is sent into the separation device 3.

By the passing of this carrier water through the inside of the separation device 3, the pellets are separated from the carrier water, and thereafter only the pellets are sent to a pellet dryer 16 and dried. On the other hand, the carrier water after the pellets are separated therefrom is discharged (flows down) to the tank 4 from the output side of the separation device 3 (outlet portions 3a, 3b) via the second pipe 6.

This carrier water flowing down the second pipe 6 passes inside the hydroelectric power generator 10 prior to reaching the tank 4, and causes the water turbine provided in this hydroelectric power generator 10 to be rotationally driven. As a result, electric power is generated in this hydroelectric power generator 10.

The regenerative device 30 is electrically connected to the hydroelectric power generator 10, and after the phase, frequency, voltage, etc. are established by the regenerative device 30, the electricity generated in the hydroelectric power generator 10 is supplied as various sources of electricity.

A specific example of electric power generation by this hydroelectric power generator 10 is provided next.

In a case of the height difference H between the tank 4 and the separation device 3 being 25 (m), if the volume Q of carrier water flowing inside the first pipe 5 is set to approximately 0.194 (m³/sec), i.e. 700 (m³/h), the output P (kW) of the hydroelectric power generator 10 is obtained using the following formula.

$$P = 9.8 \times Q \times \mu G \times \mu T$$

In the formula, μG is the power generator efficiency and μT is the water turbine efficiency.

Herein, μG×μT=0.85 is employed.

As a result, it is found that an output of approximately 40 kW is obtained from the hydroelectric power generator 10.

As is obvious from the above explanation, the underwater cutting and pelletizing apparatus 1 of the present first embodiment is a configuration in which the hydroelectric power generator 10 generates power by way of the flow of carrier water sent (flowing down) from the separation device 3 to the tank 4. Therefore, the electricity generated by this hydroelectric power generator 10 can be used in various applications.

Specifically, effective use of the potential energy of the carrier water brought about by pumping the carrier water from the cutting device 2 to the separation device 3 of a higher installation is achieved with the underwater cutting and pelletizing apparatus 1 of the present first embodiment.

Second Embodiment

Figure 2:
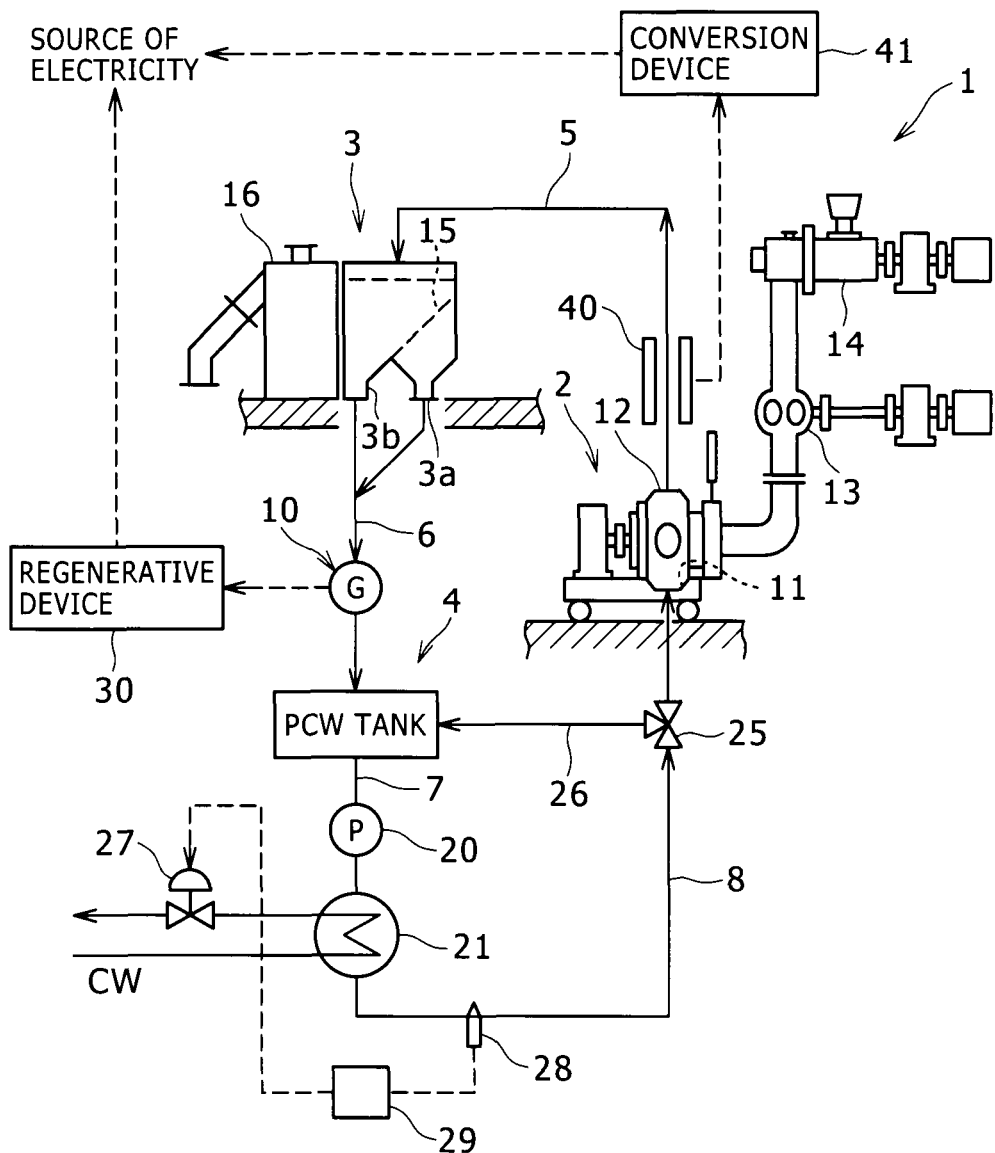
FIG. 2 is a side view schematically showing a second embodiment of an underwater cutting and pelletizing apparatus according to the present invention.

FIG. 2 shows a second embodiment of the underwater cutting and pelletizing apparatus 1 according to the present invention.

The second embodiment is further configured to have a thermoelectric power generator 40 provided in addition to the configuration of the first embodiment.

The thermoelectric power generator 40 is for carrying out electric power generation based on the amount of heat possessed by the carrier water, and is configured by thermoelectric elements, for example.

So long as this thermoelectric power generator 40 is between the output side of the cutting device 2 (water chamber 11) and the input side of the pump 20, the installation position thereof is not particularly limited. In order to make the arrangement of the thermoelectric power generator 40 as close as possible to the water chamber 11 of the cutting device 2 in the second embodiment, this thermoelectric power generator 40 is arranged at a portion of the first pipe 5 standing upwards from the cutting device 2. By arranging in this way, the heat absorbed from the molten resin in the water chamber 11 can be utilized in electric power generation to the fullest.

The thermoelectric power generator 40 is preferably arranged in a state it contacts the outer circumferential surface of the first pipe 5.

The reason thereof is that, in a case of the thermoelectric power generator 40 being provided on the inside of the first pipe 5, the pipe resistance in the first pipe 5 increases due to complication of the seal structure or the like, there is a fear of a negative influence on the process due to accumulation of resin slag in the carrier water, maintenance of the thermoelectric power generator 40 becomes troublesome, and the thermoelectric power generator 40 tends to corrode or short-circuit due to moisture.

In other words, these flaws can be prevented by providing the thermoelectric power generator 40 outside of the first pipe 5. However, in a case that a structure is adopted that can reliably avoid these flaws, the thermoelectric power generator 40 may be provided inside (disposed to contact the carrier water) of the first pipe 5.

A conversion device 41 is electrically connected to this thermoelectric power generator 40, and after the phase, frequency, voltage, etc. are established by the conversion device 41, the electricity generated in the thermoelectric power generator 40 is supplied as various sources of power.

In this way, the underwater cutting and pelletizing apparatus 1 of the second embodiment is a configuration that includes not only the hydroelectric power generator 10, but also the thermoelectric power generator 40 that performs electric power generation based on the quantity of heat possessed by the carrier water. Therefore, the electricity generated by this thermoelectric power generator 40 can also be used in various applications.

In other words, effective use of the potential energy of the carrier water brought about by pumping the carrier water from the cutting device 2 to the separation device 3 of an higher installation is achieved with the underwater cutting and pelletizing apparatus 1 of the present second embodiment, as well as the effective use of thermal energy absorbed from the molten resin by the carrier water in the water chamber 11 of the cutting device being achieved therewith.

It should be noted that effective use of thermal energy can be defined in other words as the recovering, in advance, the radiation of heat while the carrier water is stored in the tank 4 as well as the loss in thermal energy accompanying cooling the carrier water by the heat exchanger 21 at a downstream side of the tank 4.

Third Embodiment

Figure 3:
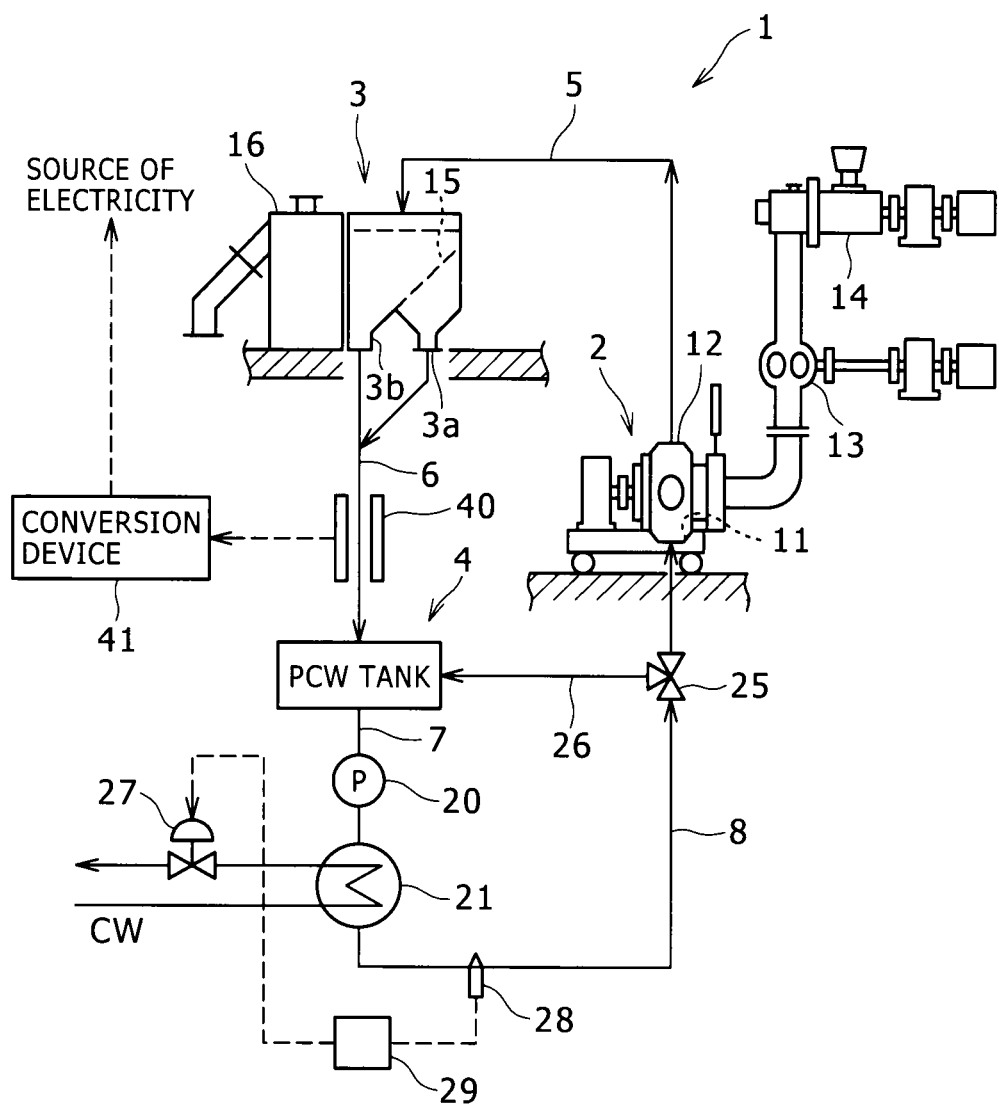
FIG. 3 is a side view schematically showing a third embodiment of an underwater cutting and pelletizing apparatus according to the present invention.

FIG. 3 shows a third embodiment of the underwater cutting and pelletizing apparatus 1 according to the present invention.

The third embodiment is a configuration in which only the thermoelectric power generator 40 is provided between the output side of the cutting device 2 (water chamber 11) and the input side of the pump 20.

By omitting the hydroelectric power generator 10 and providing only the thermoelectric power generator 40 in this way, effective use of thermal energy arising in the carrier water is achieved. It should be noted that, since only the thermoelectric power generator 40 is provided, the provision position thereof may be set between the separation device 3 and the tank 4 (middle portion of the second pipe 6), in the tank 4 itself, between the tank 4 and the pump 20 (middle portion of the third pipe 7), or the like.

Additionally, since the tank 4 stores a large amount of carrier water, the loss of thermal energy accompanying radiation from the tank 4 while being stored in the tank 4 can be effectively recovered by installing the thermoelectric power generator 40 in the tank 4 itself.

The present invention is not to be limited to the respective embodiments, but can be appropriately modified according to the mode of implementation.

For example, the structure, shape, dimensions, quantities, materials, and the like can be suitably modified, in accordance with the gist of the present invention, for the underwater cutting and pelletizing apparatus 1, and each configuration or the overall configuration of the underwater cutting and pelletizing apparatus 1.

The installation height between the separation device 3 and the tank 4 in the hydroelectric power generator 10 is not particularly limited. In addition, the detailed structure, the output, etc. of this hydroelectric power generator 10 and the regenerative device 30 are not limited.

It is possible to provide a bypass pipe (included in the return side of the circulation path) such that carrier water is guided from the output side of the water chamber 11 of the cutting device 2 to the input side of the tank 4 without passing through the separation device 3. In a case of providing such a bypass pipe, the hydroelectric power generator 10 and the thermoelectric power generator 40 can be provided in this bypass pipe.

The detailed structure, output, etc. of the thermoelectric power generator 40 and the conversion device 41 are not limited.

What is claimed is:

1. An underwater cutting and pelletizing apparatus, comprising:
    a cutting device with a water chamber having a cutter, wherein the cutting device cuts molten resin extruded from a die into pellets, the molten resin being carried by carrier water in the water chamber;
    a separation device that separates, from the carrier water, the pellets sent from the water chamber of said cutting device to downstream with carrier water, said separation device being disposed at a location higher than said cutting device;
    a tank that is disposed below said separation device and stores carrier water discharged from said separation device;
    a circulation path formed so as to circulate carrier water between said tank and the water chamber, the circulation path including a pipe standing upwards from the water chamber; and
    an electric power generator comprising a thermoelectric power generator that performs electric power generation based on a quantity of heat possessed by carrier water that is in said circulation path,
    wherein said thermoelectric power generator comprises a thermoelectric element that is mounted at an outer circumferential surface of the standing upward pipe adjacent to the water chamber, such that the heat absorbed from the molten resin in the water chamber is utilized in electric power generation to the fullest.

* * * * *